United States Patent
Wada et al.

(10) Patent No.: US 10,122,273 B2
(45) Date of Patent: Nov. 6, 2018

(54) DC-DC CONVERTER

(71) Applicant: Mitsubishi Electric Corporation, Tokyo (JP)

(72) Inventors: Fumio Wada, Tokyo (JP); Hiroya Sannai, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/325,198

(22) PCT Filed: Sep. 1, 2014

(86) PCT No.: PCT/JP2014/072916
§ 371 (c)(1),
(2) Date: Jan. 10, 2017

(87) PCT Pub. No.: WO2016/035120
PCT Pub. Date: Mar. 10, 2016

(65) Prior Publication Data
US 2017/0187288 A1  Jun. 29, 2017

(51) Int. Cl.
*G05F 1/00* (2006.01)
*G05F 1/569* (2006.01)
(Continued)

(52) U.S. Cl.
CPC .............. *H02M 3/158* (2013.01); *H02M 1/08* (2013.01); *H02M 3/1588* (2013.01);
(Continued)

(58) Field of Classification Search
CPC ........... G05F 1/463; G05F 1/567; G05F 3/245
(Continued)

(56) References Cited

U.S. PATENT DOCUMENTS 7,492,135 B2    2/2009  Saeki et al.
7,675,763 B2 *  3/2010  Okuda ................... H01L 23/34
                                                 323/276
(Continued)

FOREIGN PATENT DOCUMENTS

CN    101331670 A    12/2008
CN    101904080 A    12/2010
(Continued)

OTHER PUBLICATIONS

Notification of Transmittal of Translation of the International Preliminary Report on Patentability (Chapter I) and Translation of Written Opinion of the International Searching Authority; PCT/JP2014/072916; dated Mar. 16, 2017.

(Continued)

*Primary Examiner* — Gary Nash
(74) *Attorney, Agent, or Firm* — Studebaker & Brackett PC

(57) ABSTRACT

An object is to provide a technique enabling conversion efficiency to be increased irrespective of an operating ambient temperature. A DC-DC converter includes switching elements, a drive unit which drives the switching elements to conduct synchronous rectification, a freewheel diode connected in parallel to the switching element, and a temperature detection circuit which detects a temperature of the freewheel diode. The drive unit stops driving the switching element when the temperature detected by the temperature detection circuit is equal to or lower than a predetermined first threshold value.

4 Claims, 5 Drawing Sheets

(51) Int. Cl.
*G05F 1/571* (2006.01)
*H02M 3/158* (2006.01)
*H02M 1/08* (2006.01)
*H02M 1/00* (2006.01)
*H02M 1/32* (2007.01)

(52) U.S. Cl.
CPC ............... *H02M 2001/0048* (2013.01); *H02M 2001/0054* (2013.01); *H02M 2001/327* (2013.01); *Y02B 70/1466* (2013.01); *Y02B 70/1491* (2013.01)

(58) Field of Classification Search
USPC .......................................... 323/274–278, 284
See application file for complete search history.

(56) References Cited

U.S. PATENT DOCUMENTS

| | | | | |
|---|---|---|---|---|
| 8,072,241 | B2* | 12/2011 | Kouno | H01L 29/7397 326/118 |
| 8,076,915 | B2 | 12/2011 | Nakazawa | |
| 9,112,429 | B2 | 8/2015 | Ikeda et al. | |
| 2005/0083025 | A1* | 4/2005 | Brown | H02M 3/158 323/283 |
| 2006/0001408 | A1* | 1/2006 | Southwell | H02M 3/1584 323/282 |
| 2007/0284664 | A1 | 12/2007 | Okuda et al. | |
| 2009/0128117 | A1 | 5/2009 | Ochiai et al. | |
| 2011/0181263 | A1* | 7/2011 | Maruyama | H03K 17/0828 323/284 |
| 2011/0210713 | A1* | 9/2011 | Kazama | H02M 3/1588 323/311 |
| 2012/0049820 | A1* | 3/2012 | Moussaoui | H02M 1/36 323/282 |
| 2013/0002227 | A1* | 1/2013 | Ikeda | H02M 7/5387 323/311 |

FOREIGN PATENT DOCUMENTS

| | | |
|---|---|---|
| CN | 102857135 A | 1/2013 |
| JP | 2006-296186 A | 10/2006 |
| JP | 2010-017061 A | 1/2010 |
| JP | 2010-259241 A | 11/2010 |
| JP | 2013-013220 A | 1/2013 |
| JP | 2013-115931 A | 6/2013 |

OTHER PUBLICATIONS

International Search Report issued in PCT/JP2014/072916; dated Nov. 25, 2014.
A Chinese Office Action issued by the State Intellectual Property Office dated Jun. 28, 2018, which corresponds to Japanese Patent Application No. 201480081694.4 and is related to U.S. Appl. No. 15/325,198; with English Translation.

* cited by examiner

F I G . 1
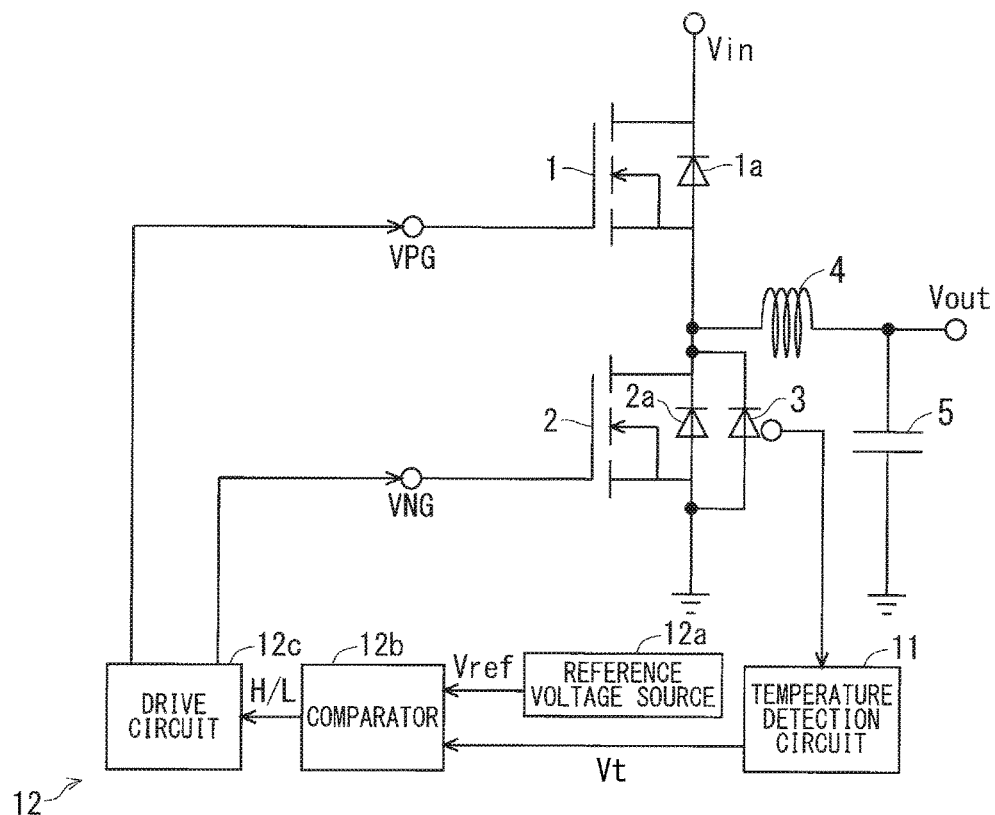

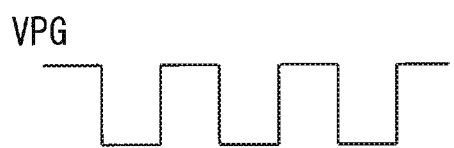
FIG. 2A
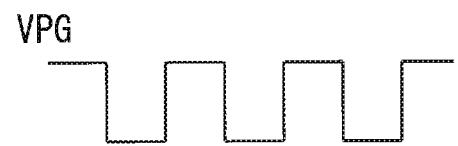
FIG. 2B

F I G . 3
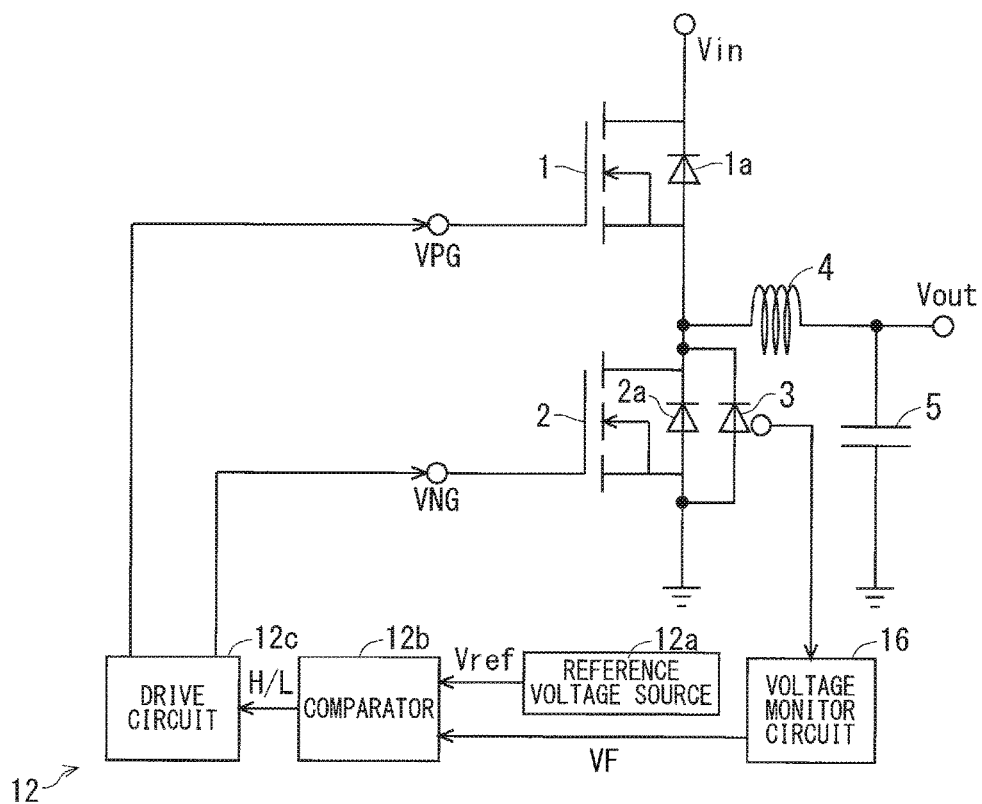

F I G . 4
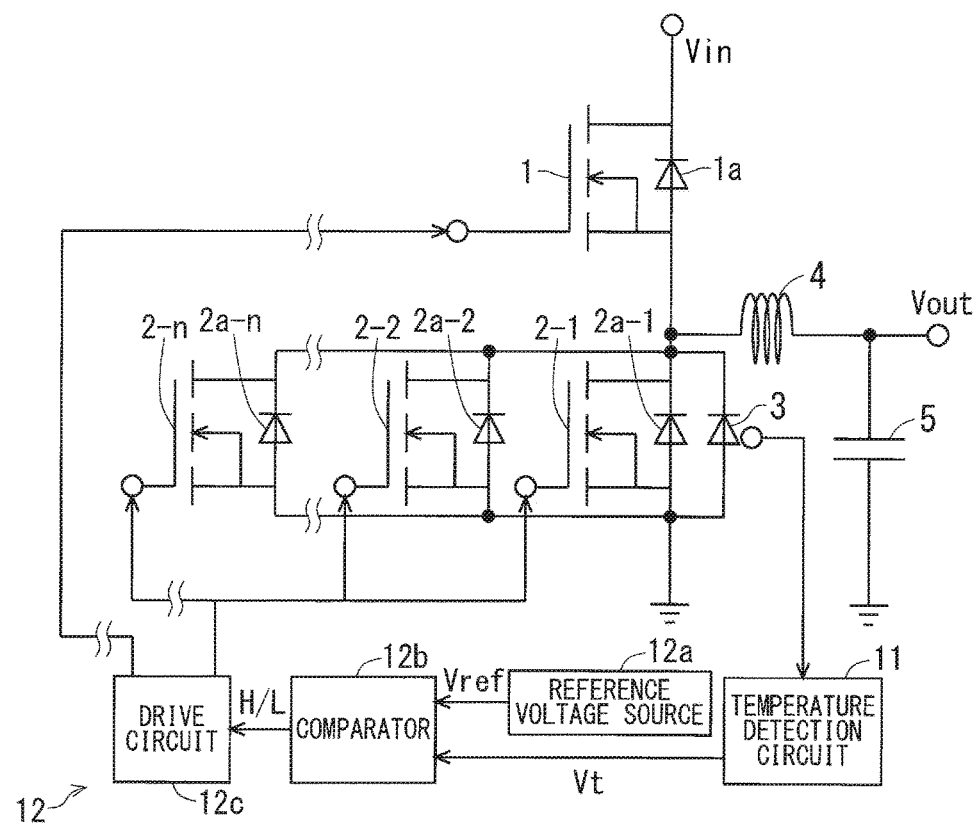

DC-DC CONVERTER

TECHNICAL FIELD

The present invention relates to a DC-DC converter.

BACKGROUND ART

Conventionally, a so-called synchronous rectification type DC-DC converter has been widely used which while driving alternate switching of two semiconductor switching elements connected in series, smoothes a resultantly generated alternating current component by means of an inductor and a capacitor.

For example, a synchronous rectification type DC-DC converter disclosed in Patent Document 1 drives a switching element on a low side to conduct synchronous rectification when an electric load is relatively high, and fails to drive the switching element on the low side and conducts asynchronous rectification (diode rectification) by a diode connected in parallel thereto when the electric load is low. According to such a technique, current conversion efficiency can be improved.

PRIOR ART DOCUMENT

Patent Document

Patent Document 1: Japanese Patent Application Laid-Open No. 2006-296186

SUMMARY OF INVENTION

Problems to be Solved by the Invention

However, because synchronous/asynchronous switching is conducted according only to an electric load irrespective of an operating ambient temperature, conventional art has a problem that conversion efficiency cannot be always improved in actual use. In particular, in a semiconductor element formed of silicon or the like as a raw material, conversion efficiency is drastically decreased because of an increased electric loss at high temperature.

Thus, in view of the above-described problem, the present invention aims at providing a technique enabling conversion efficiency to be increased irrespective of an operating ambient temperature.

Means for Solving the Problems

A DC-DC converter according to the present invention includes a high-side switching element and a low-side switching element, a drive unit which drives the high-side switching element and the low-side switching element to conduct synchronous rectification, a freewheel diode connected in parallel to the low-side switching element, and a temperature detection unit which detects a temperature of the freewheel diode. When a temperature detected by the temperature detection unit is equal to or lower than a predetermined first threshold value, the drive unit stops driving the low-side switching element.

Effects of the Invention

According to the present invention, irrespective of an operating ambient temperature, conversion efficiency of a DC-DC converter can be improved.

Other objects, features, aspects and advantages of the present invention will become more apparent from the following detailed description and the accompanying drawings.

BRIEF DESCRIPTION OF DRAWINGS

FIG. 1 is a circuit diagram showing a configuration of a DC-DC converter according to a first embodiment.

FIGS. 2A and 2B are diagrams showing a driving method of the DC-DC converter according to the first embodiment.

FIG. 3 is a circuit diagram showing a configuration of a DC-DC converter according to a second embodiment.

FIG. 4 is a circuit diagram showing a configuration of a DC-DC converter according to a third embodiment.

DESCRIPTION OF EMBODIMENTS

First Embodiment

Figure 5:
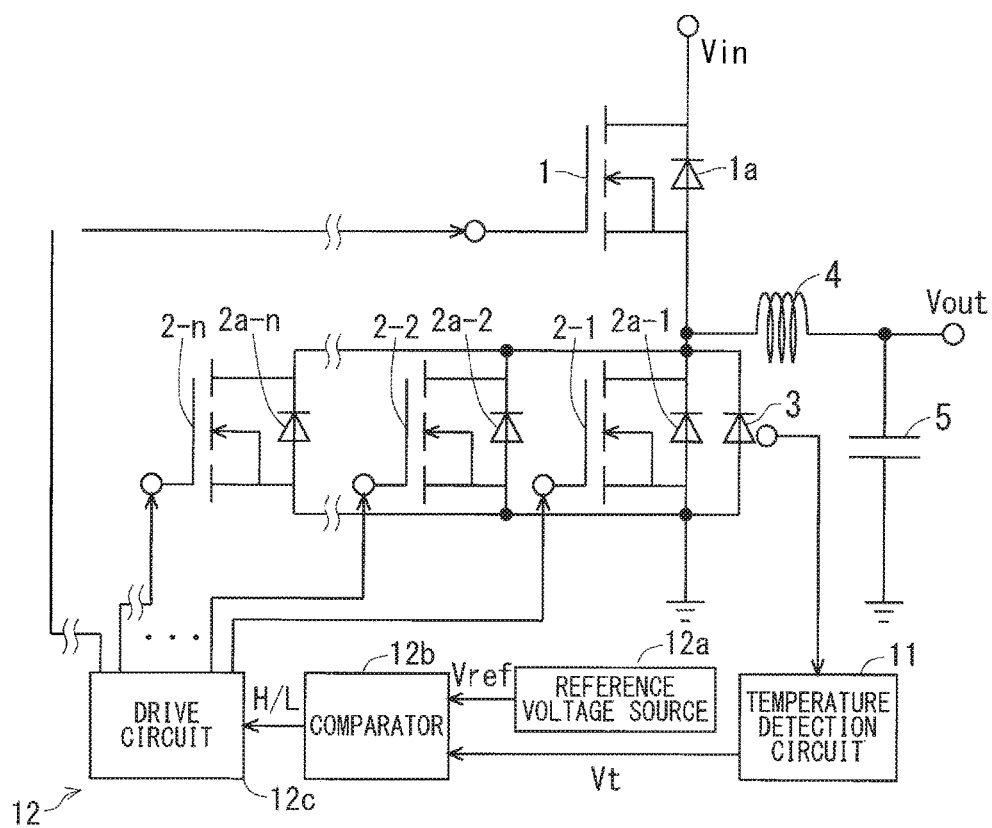
FIG. 5 is a circuit diagram showing a configuration of a DC-DC converter according to a modification of the third embodiment.

FIG. 1 is a circuit diagram showing a configuration of a DC-DC converter according to a first embodiment of the present invention. FIG. 1 shows a buck converter which outputs a DC voltage lower than an input DC voltage as one example of a DC-DC converter.

The DC-DC converter in FIG. 1 includes a high-side switching element 1, a low-side switching element 2, a diode 1a, a diode 2a, a freewheel diode 3, an inductor 4, a capacitor 5, a temperature detection circuit 11, a reference voltage source 12a, a comparator 12b, and a drive circuit 12c.

The switching elements 1 and 2 are connected in series between a high potential (Vin) and a low potential (ground potential). A drain of the switching element 1 is connected to the high potential, a source of the switching element 1 is connected to a drain of the switching element 2, and a source of the switching element 2 is connected to the low potential. Although in FIG. 1, an n-channel MOSFET (Metal Oxide Semiconductor Field Effect Transistor) is applied to the switching elements 1 and 2, application is not limited thereto.

A cathode of the diode 1a is connected to the drain of the switching element 1, and an anode of the diode 1a is connected to the source of the switching element 1. Similarly, a cathode of the diode 2a is connected to the drain of the switching element 2, and an anode of the diode 2a is connected to the source of the switching element 2.

The freewheel diode 3 is connected in parallel to the switching element 2 similarly to the diode 2a. Specifically, a cathode of the freewheel diode 3 is connected to the drain of the switching element 2, and an anode of the freewheel diode 3 is connected to the source of the switching element 2. To the freewheel diode 3, for example, a Schottky-barrier diode is applied.

One end of the inductor 4 is connected to the source of the switching element 1 and to the drain of the switching element 2, and the other end of the inductor 4 is the output end of the DC-DC converter.

One end of the capacitor 5 is connected to the other end of the inductor 4, and the other end of the capacitor 5 is connected to the ground potential.

The temperature detection circuit 11 (temperature detection unit) detects a temperature of the freewheel diode 3 and outputs a voltage Vt corresponding to the temperature to the comparator 12b. The temperature detection circuit 11 includes, for example, a semiconductor element, a thermistor and a temperature-voltage converter such as a thermocouple. The temperature-voltage converter is arranged (mounted), for example, nearest to the freewheel diode 3 or on a chip of the same to enable output of a voltage corresponding to an ambient temperature.

The reference voltage source 12a, the comparator 12b and the drive circuit 12c configure a drive unit 12. The drive unit 12 basically drives the high-side switching element 1 and the low-side switching element 2 to conduct synchronous rectification. When a temperature detected by the temperature detection circuit 11 is equal to or lower than a predetermined first threshold value, however, the drive unit 12 stops driving the switching element 2. Next, components of the drive unit 12 having such functions will be described.

The reference voltage source 12a outputs a voltage Vref corresponding to the first threshold value to the comparator 12b.

The comparator 12b compares the voltage Vt from the temperature detection circuit 11 with the voltage Vref from the reference voltage source 12a to output a comparison result thereof to the drive circuit 12c. Specifically, the comparator 12b outputs a result indicating whether or not a temperature detected by the temperature detection circuit 11 is equal to or lower than the first threshold value to the drive circuit 12c. Here, when the detected temperature exceeds the first threshold value, the comparator 12b outputs an H (High) signal for driving the low-side switching element 2. By contrast, when the detected temperature is equal to or lower than the first threshold value, the comparator 12b outputs an L (Low) signal to stop driving the low-side switching element 2.

The drive circuit 12c is capable of switching the switching elements 1 and 2 by applying a voltage to gates VPG and VNG of the switching elements 1 and 2, respectively.

FIGS. 2A and 2B are waveform diagrams showing a method (control method) of driving the switching elements 1 and 2 by the drive circuit 12c. When receiving a comparison result (H signal) indicating that a detected temperature exceeds the first threshold value from the comparator 12b, the drive circuit 12c drives the switching elements 1 and 2 so as to alternately switch the same in synchronization. By contrast, when receiving a comparison result (L signal) indicating that the detected temperature is equal to or lower than the first threshold value from the comparator 12b, the drive circuit 12c stops driving the low-side switching element 2 while maintaining driving of the high-side switching element 1.

<Operation>

Repetitious switching of the high-side switching element 1 generates a voltage including an alternating current component at the one end of the inductor 4. The inductor 4 and the capacitor 5 generate an output voltage (Vout) lower than the input voltage (Vin) by smoothing the voltage including the alternating current component. On this occasion, a voltage value of the output voltage can be adjusted by conducting PWM (pulse width modulation) in which an off period and an on period of the switching element 1 are adjusted.

Immediately after switching of the switching element 1 from on to off, the inductor 4 acts to maintain a current flow by an induced electromotive force. For suppressing an effect on the element exerted by this action, the switching element 2 and the freewheel diode 3 have a rectification function of flowing a current from the ground potential to a direction toward the inductor 4.

In the present first embodiment, when the temperature of the freewheel diode 3 exceeds the first threshold value, the high-side switching element 1 and the low-side switching element 2 are synchronously driven to conduct synchronous rectification. By contrast, when the temperature of the freewheel diode 3 is equal to or lower than the first threshold value, driving of the switching element 2 is stopped, and the freewheel diode 3 conducts asynchronous rectification (diode rectification). The diode 1a may also have a function of asynchronous rectification.

Outline of First Embodiment

Since the DC-DC converter according to the present first embodiment as described above can reduce a temperature increase due to an electric loss at the freewheel diode 3, an electric loss at high temperature can be suppressed. Therefore, irrespective of an operating ambient temperature, conversion efficiency of the DC-DC converter can be increased. Additionally, when the freewheel diode 3 is at a low temperature (low load), a reverse current to the switching element 2 can be suppressed to enable a resultant loss to be reduced. Along therewith, a long life is expected from a semiconductor element. In particular, for example, in a DC-DC converter in which a voltage of several hundred V is used, these effects are considered to be increased. Additionally, reduction in size and costs of a cooling mechanism is also expected.

Modifications of First Embodiment

The drive unit 12 (here, the reference voltage source 12a, the comparator 12b and the drive circuit 12c) in FIG. 1 may be constructed from one IC (Integrated Circuit) or from a plurality of ICs. In a configuration of the drive unit 12 constructed from one IC, reduction in size, weight and costs of the device is expected.

Additionally, at least one of semiconductor elements configuring the DC-DC converter may be configured with a wideband gap semiconductor, for example, silicon carbide (SiC), gallium nitride (GaN) or the like. Since such a configuration enables suppression of a switching loss caused at a high temperature, the configuration is effective, in particular, for switching drive and stop according to a temperature condition as described above. A semiconductor element here is assumed to be, for example, the switching elements 1 and 2, the diodes 1a and 2a, or the freewheel diode 3, but is not limited thereto.

The foregoing modifications are applicable also to second and third embodiments described later.

Second Embodiment

FIG. 3 is a circuit diagram showing a configuration of a DC-DC converter according to a second embodiment of the present invention. In DC-DC converters according to the second and subsequent embodiments, the same or similar components as those described above will be given the same reference signs, and different parts will be mainly described. As illustrated in FIG. 3, the DC-DC converter according to the present second embodiment has a configuration with a voltage monitor circuit 16 added to the configuration of FIG. 1. In FIG. 3, illustration of the temperature detection circuit 11 is omitted.

The voltage monitor circuit 16 (voltage detection unit) monitors (detects) a forward voltage (voltage) of the freewheel diode 3 to output a voltage VF corresponding to the forward voltage to the comparator 12b.

The drive unit 12 stops driving the low-side switching element 2 when similarly to the temperature detected by the temperature detection circuit 11, the voltage detected by the voltage monitor circuit 16 is equal to or higher than a predetermined second threshold value.

Such a DC-DC converter according to the present second embodiment as described above can obtain the same effect as in the first embodiment relative to electric loads.

Third Embodiment

FIG. 4 is a circuit diagram showing a configuration of a DC-DC converter according to a third embodiment of the present invention. As illustrated in FIG. 4, in a DC-DC converter according to the present third embodiment, a plurality of low-side switching elements 2 (switching elements 2-1, 2-2, . . . , 2-n) are connected in parallel to each other. Additionally, a plurality of diodes 2a (diodes 2a-1, 2a-2, . . . , 2a-n) are connected in parallel to each other as well.

In the present third embodiment, a drive unit 12 uniformly stops driving the plurality of switching elements 2 when a temperature detected by a temperature detection circuit 11 is equal to or lower than a predetermined first threshold value.

Such a DC-DC converter according to the present third embodiment as described above enables a temperature increase to be suppressed more which is caused by an electric loss at a freewheel diode 3 than by the first embodiment. Additionally, a longer life of a semiconductor element such as the switching element 2 can be expected than in the first embodiment.

Modification of Third Embodiment

FIG. 5 is a circuit diagram showing a configuration of a DC-DC converter according to a modification of the third embodiment.

In the above-described third embodiment, the drive unit 12 uniformly stops driving the plurality of switching elements 2 when a temperature detected by the temperature detection circuit 11 is equal to or lower than the predetermined first threshold value.

By contrast, in the present modification, a drive unit 12 individually stops driving a plurality of switching elements 2 when a temperature detected by a temperature detection circuit 11 is equal to or lower than a predetermined first threshold value. This enables the drive unit 12 to change the number of the low-side switching elements 2 to be driven based on a temperature detected by the temperature detection circuit 11. One example of a change of the number of the low-side switching elements 2 to be driven is assumed to reduce, by the drive unit 12, the number of the switching elements 2 to be driven (or increase the number of the switching elements 2 to be stopped), or the like as the temperature detected by the temperature detection circuit 11 becomes lower.

The DC-DC converter according to the present modification as described above can reduce a temperature increase due to an electric loss at a freewheel diode 3 more than in the first embodiment. Additionally, a longer life of a semiconductor element such as the switching element 2 can be expected than in the first embodiment.

In FIG. 5, one drive circuit 12c is provided which controls drive of the plurality of switching elements 2. The circuit is, however, not limited thereto, but a plurality of drive circuits 12c may be provided which control drive of the plurality of switching elements 2, respectively.

Additionally, the present invention allows the respective embodiments and modifications to be freely combined or the respective embodiments to be appropriately modified or omitted within the scope of the invention.

While the present invention has been described in detail, the foregoing description is in all aspects illustrative and not restrictive. It is therefore understood that numerous modifications not illustrated can be assumed without departing from the scope of the invention.

REFERENCE SIGNS LIST 1, 2: switching element
3: freewheel diode
11: temperature detection circuit
12: drive unit
16: voltage monitor circuit

The invention claimed is:
1. A DC-DC converter comprising:
a high-side switching element and a low-side switching element;
a drive unit which drives said high-side switching element and said low-side switching element to conduct synchronous rectification;
a freewheel diode connected in parallel to said low-side switching element; and
a temperature detection unit which detects a temperature of said freewheel diode,
wherein when a temperature detected by said temperature detection unit is equal to or lower than a predetermined first threshold value, said drive unit stops driving said low-side switching element, and wherein
a plurality of said low-side switching elements are connected in parallel to each other, and
said drive unit changes the number of said low-side switching elements to be driven based on a temperature detected by said temperature detection unit.

2. The DC-DC converter according to claim 1, further comprising a voltage detection unit which detects a voltage of said freewheel diode,
wherein said drive unit stops driving said low-side switching element when the voltage detected by said voltage detection unit is equal to or higher than a predetermined second threshold value.

3. The DC-DC converter according to claim 1, wherein said drive unit is constructed from one IC (Integrated Circuit).

4. The DC-DC converter according to claim 1, wherein at least one of semiconductor elements configuring said DC-DC converter is configured with a wideband gap semiconductor.

* * * * *